July 15, 1958   J. J. RENIE ET AL   2,842,983
SAW SHARPENING APPARATUS
Filed Feb. 10, 1955   3 Sheets-Sheet 1
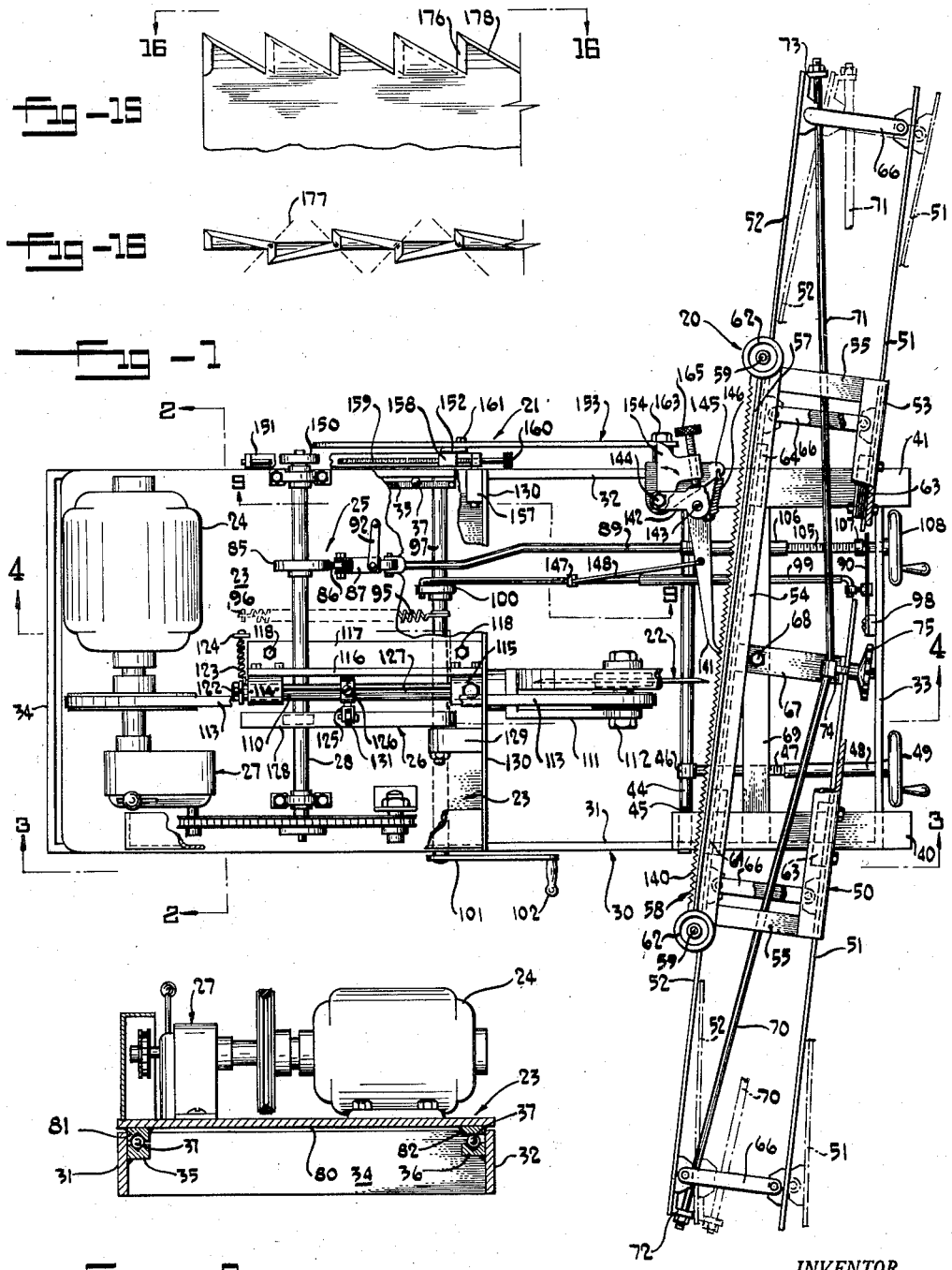
INVENTOR.
John E. Jones, Jack J. Renie &
Victor W. Henderson
BY
Zulwider, Mattingly & Huntley
ATTORNEYS July 15, 1958 J. J. RENIE ET AL 2,842,983
SAW SHARPENING APPARATUS
Filed Feb. 10, 1955 3 Sheets-Sheet 2
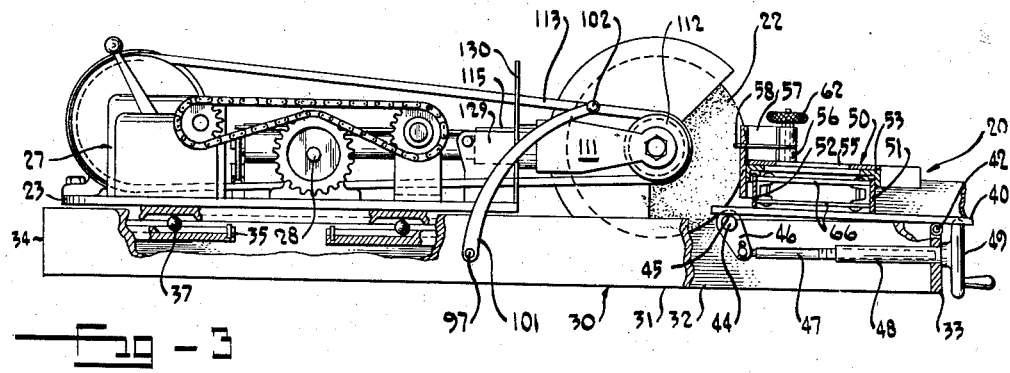
Fig-3
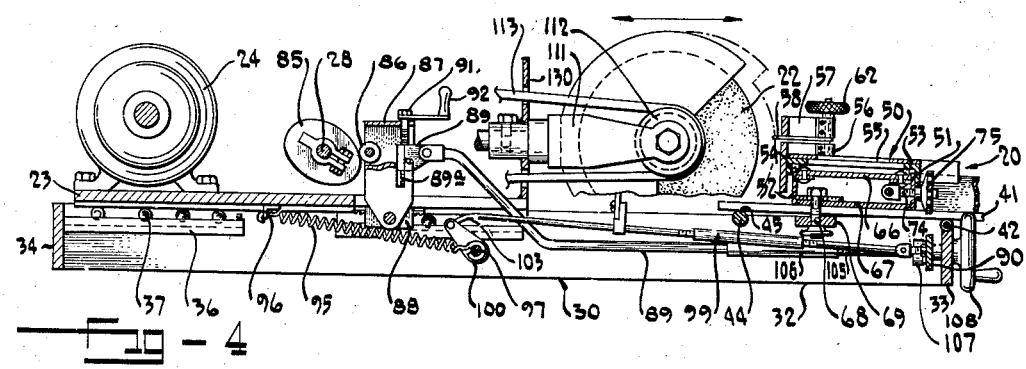
Fig-4
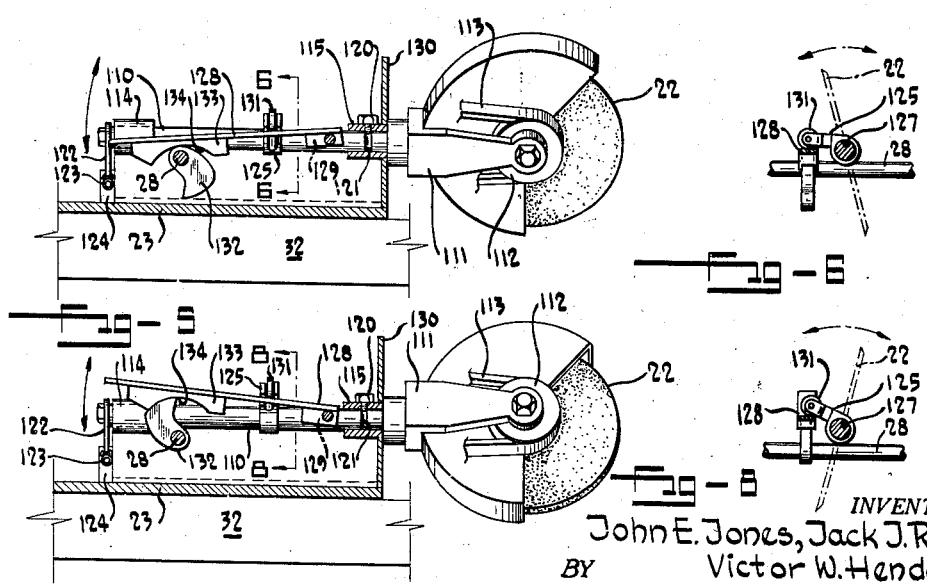
Fig-5
Fig-6
Fig-7
Fig-8
INVENTOR.
John E. Jones, Jack J. Renie &
BY Victor W. Henderson
Fulwider, Mattingly & Huntley
ATTORNEYS

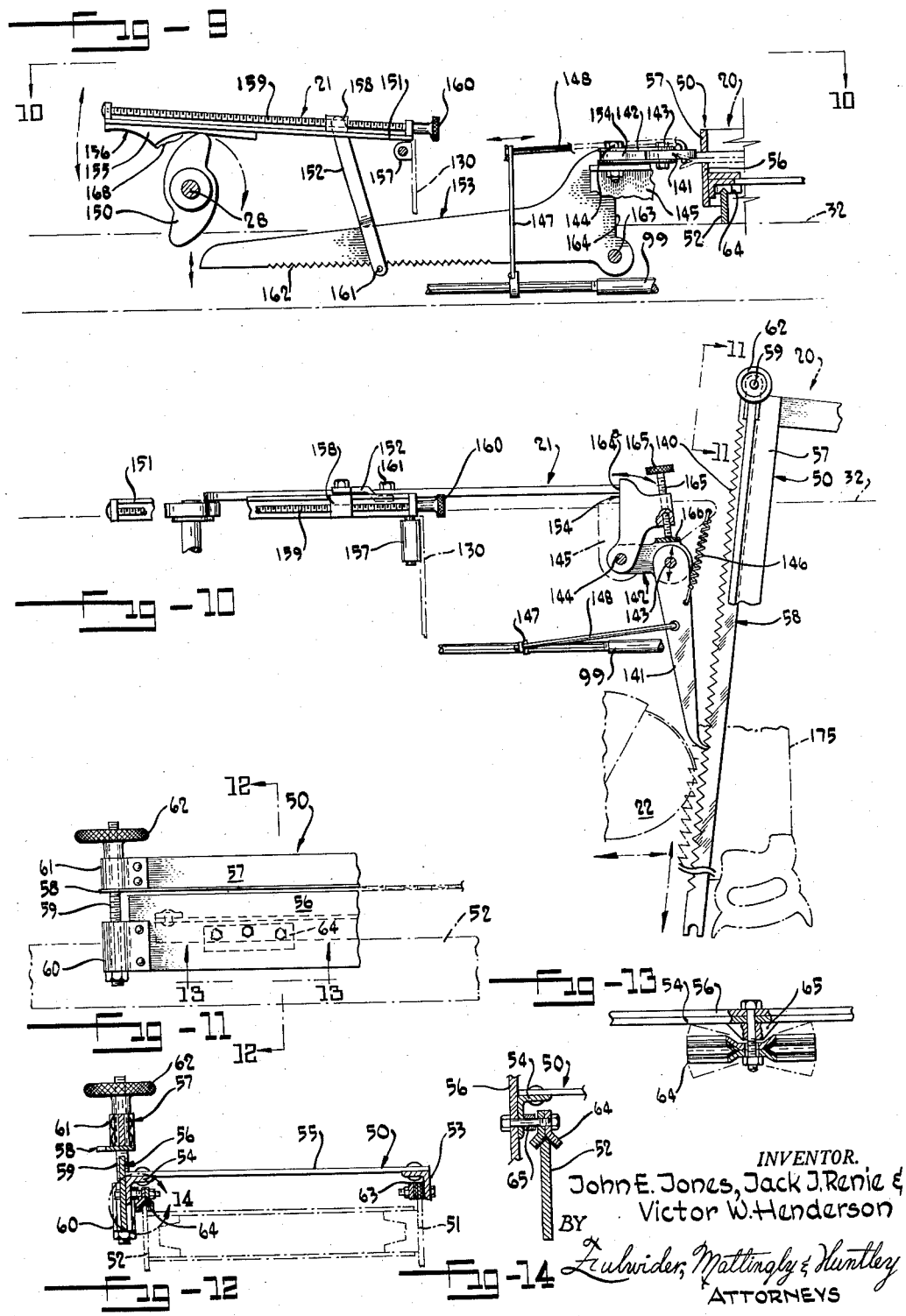

United States Patent Office 2,842,983
Patented July 15, 1958

2,842,983

SAW SHARPENING APPARATUS

Jack J. Renie, Los Angeles, and John E. Jones and Victor W. Henderson, Burbank, Calif.

Application February 10, 1955, Serial No. 487,312

6 Claims. (Cl. 76—41)

The present invention relates generally to apparatus for sharpening cutting tools and more particularly to a machine for regrinding saw teeth. While the invention illustrated herein will be shown as adapted for sharpening a carpenter's hand saw, it will be appreciated that it may with simple modifications be adapted to sharpen other toothed cutting tools.

While various devices have been provided in the past for automatically reforming and sharpening saw teeth, these prior devices have had several disadvantages. It is usual practice to employ a rotating abrasive wheel to grind or resurface the teeth in resharpening a saw and such a wheel is employed in the present invention. In prior devices, however, difficulty has been encountered for the reason that no provision has heretofore been suggested or provided for alternately changing the disposition of the grinding wheel as the same moves from tooth to tooth, so as to properly surface the alternately disposed teeth of a conventional saw. It has been the usual practice in the past to set the grinding wheel in one angular position and, in a first pass, grind every other tooth in the saw and thereafter to change the angle of the wheel and repeat the grinding process, in a second pass, grinding the intermediate teeth missed in the first pass. This procedure leads to the difficulty that substantial wear of the grinding wheel during the first pass makes the first ground alternate tooth spaces of the saw after regrinding considerably deeper than the intermediate alternate tooth spaces formed in the second pass.

Another difficulty encountered in previous devices is the fact that they are not properly adjustable to suit various tooth angles, tooth spacing, crown, and other variables encountered in the different types of saws available and in general use.

With the foregoing deficiencies of prior devices in mind, it is a major object of the present invention to provide a saw sharpening apparatus which is substantially universal, that is, can be adjusted to resharpen practically all conventionally available types of saws.

It is another object of the invention to provide a machine of the class described which is completely automatic, that is can be adjusted and set in operation and will, in one pass, completely grind all of the teeth of a saw.

It is still another object to provide apparatus of the class described in which the rear edges as well as the front cutting edges of the teeth are ground whereby to produce a perfectly formed tooth in a single regrinding operation.

It is yet a further object of the present invention to provide apparatus of the class described in which the shape of the reground tooth is determined by mechanical movements of a saw advancing mechanism and is not determined entirely by the shape of the grinding wheel.

The foregoing and additional objects and advantages of the invention will be apparent from the following detailed description of a presently preferred embodiment thereof, consideration being given also to the attached drawings in which:

Figure 1 is a top plan view of a saw grinding machine embodying the present invention, certain parts being broken away to reveal underlying mechanism;

Figure 2 is an elevational section taken on the line 2—2 in Figure 1;

Figure 3 is a side elevational view of the apparatus shown in Figure 1 with certain portions broken away to reveal underlying mechanism;

Figure 4 is an elevational section taken on the line 4—4 in Figure 1;

Figure 5 is a fragmentary elevational view partially sectioned and illustrating one operational position of the grinding wheel employed in the present invention;

Figure 6 is an elevational section taken on the line 6—6 in Figure 5;

Figure 7 is a view similar to Figure 5 but with the parts in a different operational position;

Figure 8 is an elevational section taken on the line 8—8 in Figure 7;

Figure 9 is a fragmentary elevational view looking in the direction indicated by the line 9—9 in Figure 1 and illustrating portions of the saw advancing mechanism employed in the present invention;

Figure 10 is a plan view of the parts shown in Figure 9;

Figure 11 is an enlarged elevational view taken on the line 11—11 in Figure 10;

Figure 12 is an elevational section taken on the line 12—12 in Figure 11;

Figure 13 is an enlarged plan view looking upwardly in the direction shown at 13—13 in Figure 11;

Figure 14 is an enlarged elevational section of portions of Figure 12 as indicated at 14 in Figure 12;

Figure 15 is an enlarged elevational view of a portion of a saw, the size and angles of the teeth being exaggerated for illustrative purposes; and Figure 16 is a plan view of the saw teeth shown in Figure 15.

Before proceeding to a detailed description of the machine embodying the present invention, a general description of the organization and operation will be given, reference being made particularly to Figures 1, 2, and 3. The saw to be sharpened is mounted in a carriage-track assembly 20 wherein it is advanced tooth by tooth longitudinally by a feed mechanism 21, each tooth being resharpened by a high speed grinding wheel 22 operating in synchronism with the feed mechanism 21. The tooth forming movement of the grinding wheel 22 is accomplished by reciprocating the same in plunging strokes towards the saw as indicated by the double headed arrow in Figure 4. The reciprocating motion of the wheel 22 is produced by mounting the same together with its driving means and other mechanism to be described, on a reciprocating table 23.

Power to rotate the wheel 22, to reciprocate the table 23, and to operate the feed mechanism 21 is all delivered from a single prime mover in the present case an electric motor 24 mounted on the table 23. Mechanism for reciprocating the table 23 is indicated generally at 25 and mechanism for tilting the wheel 22 in opposite directions at alternate reciprocating strokes is indicated generally at 26.

The step-by-step feeding of the saw, the reciprocation of the table 23, and tilting of the grinding wheel 22 are all coordinated and synchronized by virtue of a single cam shaft 28 rotatably mounted on the table 23 and carrying a number of cams to be described. The cam shaft is driven by the motor 24 through a variable speed transmission 27.

The general organization of the saw grinding machine embodying the present invention having been described, the details of construction will now be explained, the description being divided into several sections as follows:

(1) The Base Frame
(2) The Saw Carriage-Track Assembly
(3) The Power Table and Reciprocating Means Therefor
(4) The Grinding Wheel, Mounting Assembly, and Tilting Mechanism
(5) The Saw Carriage Feed Mechanism
(6) Operation

The base frame

The saw-sharpening machine described herein is mounted on a base 30 comprising a pair of longitudinal side members 31 and 32 interconnected by transverse end members 33 and 34 to form a generally rectangular frame. Secured to the inner surfaces of the longitudinal members 31 and 32 are longitudinal V-tracks 35 and 36 which form rectilinear bearing races for a plurality of bearing balls 37 which support the table 23 for reciprocating motion as will be described.

Adjacent the forward end 33 of the base frame 30 a pair of track supporting members 40 and 41 are mounted on transversely extending pivots 42 located substantially in the plane of the forward transverse frame member 33. The track support members 40—41 extend rearwardly in the frame and their rearward ends are supported on a transverse rod 44 having cam portions 45 formed therein whereby rotation of the rod 44 tilts the members 40 and 41 about the fulcrum of the pivots 42 so as to raise and lower the carriage-track mechanism to be described.

Adjustable rotation of the rod 44 is accomplished by means of a crank arm 46 secured thereto and an adjustment screw 47 pivotally connected to the outer end of the crank arm 46 and threaded into a rotatable sleeve 48 journaled in the transverse frame member 33. The internally threaded sleeve 48 is provided with a hand wheel 49 whereby the sleeve 48 may be manually rotated. Since the sleeve 48 is constrained against longitudinal movement, its rotation by the hand wheel 49 moves the screw 47 longitudinally and thus rotates the rod 44 through the connection of the crank 46. Thus the exact height of the carriage-track assembly 20 may be accurately adjusted so as to place the saw carried thereby in the correct alignment with the grinding wheel 22 as will be described.

Other members mounted in the frame 30 will be described later herein in connection with the mechanisms to which they relate.

The saw carriage track assembly

The assembly for supporting and moving the saw longitudinally of itself comprises a carriage 50 movable longitudinally along a pair of tracks 51 and 52. As can be seen best in Figures 11, 12, 13, and 14 the carriage 50 is constructed with a pair of longitudinal angle members 53 and 54 interconnected by transverse members 55 and carrying along the grinding wheel-adjacent edge, a pair of clamp bars 56 and 57 between which the saw to be sharpened is clamped as shown in Figures 10 and 11.

A guide bar or template 58 having teeth therein spaced according to the same spacing as the saw to be sharpened, may also be clamped with the saw between the clamp bars 56 and 57. Threaded clamping rods 59 are arranged to pass vertically through eye members 60 and 61 at the ends of the clamp bars 56 and 57 and a hand nut 62 is threaded onto the upper end of each rod 59 whereby to clamp the saw, and if desired, the guide template 58, onto the carriage.

Under the carriage 50 and on the inner surfaces of the dependent flanges of the angle members 53 and 54 are mounted a plurality of support slides 63 and 64 which slidably engage the upper edges of the tracks 51 and 52 whereby to guide the carriage 50 longitudinally along the track assembly made up of the tracks 51 and 52. The slide members 63 at the outer edge of the carriage 50 are generally flat on their under surface and somewhat wider than the corresponding track 51 whereby to glide along the flat upper surface of the track 51.

As is shown in some detail in Figure 14 the inner track 52 has a V-shaped upper edge and the corresponding slides 64 are also V-shaped so as to constrain the carriage 50 to motion exactly along the track 52. Since, as will be hereinafter described, the tracks 51 and 52 are adapted to be curved, the V-shaped slides 64 are pivotally secured to the corresponding angle member 54 by being bolted against a fulcrum member 65 permitting a degree of rocking motion in a horizontal plane as is shown in Figure 13.

As above stated, the tracks 51 and 52 are adapted to be pulled into a curved shape. This is for the reason that many hand saws are constructed with a considerable crown, that is a convex curvature to the toothed edge. In grinding such a saw, it is desirable that the generally longitudinal movement of the saw be along a curved path corresponding to the crowned curvature of the toothed edge of the saw. To this end, the tracks 51 and 52 are relatively thin whereby to be bendable in a horizontal plane as shown in phantom line in Figure 1. In order to maintain the tracks 51 and 52 generally parallel in spite of the bending thereof previously referred to, the two tracks are joined at intervals by pivotal links 66.

Midway between their ends, the tracks 51 and 52 are rigidly secured together by a transverse member 67. The entire track assembly is in turn secured to the frame 30 by a bolt 68 which passes through the transverse member 67 and also through a transverse member 69 which is a part of the frame 30. Thus the angle of the tracks to the axis of the grinding wheel motion can be adjusted by pivoting the track about the bolt 68 before the latter is tightened.

The lower edges of the tracks 51 and 52 rest on the previously described track supporting members 40 and 41 and thus the vertical adjustment of the members 40 and 41 previously referred to raises and lowers the tracks 51 and 52 and the carriage 50 resting on the upper edges thereof.

The foregoing bowing or bending of the tracks 51 and 52 is accomplished by a pair of tension rods 70 and 71 fastened at their outer ends to angle brackets 72 and 73 on the outer ends of the tracks 52 and secured at their inner ends to an adjustment bolt 74 which passes laterally through the center of the track 51 and carries on the outer or forward end, a hand nut 75. Thus it will be seen that by tightening the nut 75 the bolt 74 is drawn laterally somewhat akin to the operation of pulling an archer's bow whereby the tension rods 70 and 71 pull laterally on the ends of the track member 52 bowing the same as shown in phantom line. The tension rods 70 and 71 can of course be a single rod bent at the center and passing loosely through an aperture in the head of the tightening bolt 74.

With the tracks 51 and 52 bowed as aforesaid it will be seen that the carriage 50 thereon due to the guiding action of the slide members 64 follows a curved path in moving longitudinally along the tracks 51 and 52.

In a preferred embodiment of the invention the slide members 63 and 64 are constructed of leather so as to have a slightly yielding friction contact with the upper edges of the tracks 51 and 52 providing a smooth movement of the carriage 50 thereon and sufficient friction between the carriage and the tracks so that the carriage will remain in an adjusted position unless forcibly moved by the feed mechanism hereinafter to be described.

The power table and reciprocating means therefor

As previously stated, the prime mover motor 24 and the various mechanisms operated thereby are all mounted on a table 23 which is in turn supported on bearing balls 37 in tracks 35 and 36 for reciprocating movement longitudinally of the frame 30. The table 23 comprises a horizontal platform 80 having secured to the under surface thereof guideways 81 and 82, one of which has a downwardly facing V-way therein in engagement with the bearing ball 37 whereby to confine the table movement to exact longitudinal movement corresponding to the axis of the lower guideway 35. To avoid kinematic redundancy the other guideway 82 on the under surface of the table 23 is flat and bears on the top surface of the bearing balls 37.

As previously stated, it is desired to move the table in controlled and adjustable longitudinal strokes. To accomplish this result, a reciprocating mechanism is provided which is driven by a two-lobe cam 85 secured to the cam shaft 28 for rotation therewith. The cam 85 rides against a cam follower roller 86 which in turn is mounted in a swinging arm 87 the lower end of which is pivotally attached through a pillow block 88 to the under surface of the table platform 80. The surface of the cam 85 is maintained in constant pressure contact with the roller 86 by a tension spring 95, the rearward end of which is anchored to the table by a bracket 96 and the forward end of which is anchored to a transverse rock-shaft 97 journaled in the side frame members 31 and 32.

As thus far described, it will be seen that rotation of the cam 85 causes rocking motion of the arm 87 with respect thereto as the follower roller 86 rolls along the periphery of the cam 85. It will be noted that if any point on the arm 87 is fixed with respect to the frame 30 the aforesaid rocking motion must cause reciprocation of the table 23.

Accordingly, the arm 87 is restrained with respect to the frame 30 by means of a tie-rod 89 connected at one end through an adjustment member 89 to the arm 87 and at the other end through a cantilever spring 90 to the front frame member 33. The adjustment member 89 is in turn secured to the arm 87 by a generally vertical threaded rod 91 and rides in slots 89a in the arm 87 whereby the effective point of connection of the rod 89 to the arm may be adjusted vertically by rotating the rod 91 through a hand crank 92.

Upon noting that the forward end of the tie-rod 89 is fixed against longitudinal movement in the frame 30, it will be seen that the amount of reciprocation of the table 23 due to the rise and fall in the cam 85 will depend on the length of the arc through which the crank arm 87 moves at the point of connection with the tie-rod 89. Thus, if the threaded rod 91 is rotated to bring the adjustment member 89 to the top of its movement along the slots 89a, a relatively large reciprocal stroke of the table 23 is effected with each rotation of the cam, whereas if the adjustment member 89 is moved to the lower end of the slots, the reciprocal strokes become relatively short.

It is desirable in the operation of mechanism of the type here described to set the grinding wheel in operation but in a position out of engagement with the saw to be operated upon. This makes possible the adjustment of all motions to be coordinated before placing the grinding wheel in position to actually operate on the saw. To accomplish this, the forward anchorage of the tie-rod 89 is longitudinally movable by bending the aforementioned cantilever spring 90. In Figure 1 it will be noted that the fixed end of the cantilever spring is secured at 98 to the transverse frame member 33 and that the spring may be bent with respect to this fixed end by a tension rod 99, the forward end of which is carried in the outer end of a crank 100 secured to the transverse rock shaft 97. At the outside of the frame member 31 a control lever 101 is also secured to the rock shaft 97 and carries a control handle 102 by which the lever 101 may be rocked forwardly or rearwardly to bend the spring 90 forwardly or rearwardly in the frame 30 thus changing the effective position of anchorage of the tie-rod 89. The rearward end of the tension rod 99 is bent downwardly as can be seen at 103 in Figure 4 whereby when the control lever 101 is moved rearwardly to one limit of its position, the point of connection of the tension rod 99 and the crank 100 passes the center of the rock shaft 97 thus retaining the mechanism in that limited position until the lever 101 is rocked forwardly.

In addition to the two-position adjustment just described, the length of the tie-rod 89 is further adjustable by having the forward portion 105 thereof threaded into a sleeve portion 106 thereby providing means for adjustable change in the length of the tie-rod 89 between its anchorage abutment 107 and the point of attachment to the arm 87. Rotation of the threaded rod portion 105 with respect to the sleeve 106 is accomplished by means of a handwheel 108 accessible at the front of the frame 30. Adjustment of the length of the tie-rod 89, it will be understood, does not affect the length of the reciprocal strokes of the table 23, but merely adjusts the position at which said strokes start and stop.

*The grinding wheel, mounting assembly, and tilting mechanism*

The grinding wheel 22 is journally mounted at the forward end of a longitudinally extending shaft 110 which carries an offset bracket 111 on which a wheel arbor 112 is mounted. The offset of the bracket 111 is such that the plane of the grinding wheel 22 is substantially on the axis of the rock shaft 110.

The grinding wheel 22 is driven directly from the prime mover 24 by a V-belt 113, the length of the V-belt being such that the hereinafter described tilting of the grinding wheel 22 does not cause the belt to jump from its sheaves.

The grinding wheel mounting shaft 110 is carried in a pair of aligned journal bearings 114 and 115 which are in turn secured to the upstanding flange 116 of an angle member 117 bolted to the table platform 80 at 118. Rotation of the shaft 110 in the bearings 114 and 115 tilts the grinding wheel 22 between the alternate positions shown in Figures 5 and 7 and also in Figures 6 and 8. A dogging bolt 120 is carried by the forward journal bearing 115 and projects into an annular groove 121 in the shaft 110 so as to prevent longitudinal movement of the shaft while still permitting the aforesaid rotation to tilt the grinding wheel 22.

At the rear of the shaft 110 an arm 122 is secured thereto forming a downwardly extending crank to the lower end of which is secured a tension spring 123 which is anchored to a bracket 124 on the upper surface of the platform 80. (See Figure 1.) The purpose of the spring 123 is to exert a constant torque on the shaft 110 urging the same to rotate in a counterclockwise direction as viewed in Figures 6 and 8.

It is desired that the degree of tilting motion of the wheel 22 be adjustable to accommodate saws of various tooth bevels. To this end the mechanism for rotating the shaft 110 includes an arm 125 longitudinally slidable along the shaft 110 and rotatively keyed thereto by a pin 126 running in a keyway 127. (See Figure 1.) As can be seen best in Figures 6 and 8 the outer end of the arm 125 carries a roller 131 which is in rolling contact with a rockable flat bar 128, the forward end of which is pivotally carried in a pillow-block 129, the latter being in turn secured to an upstanding flange 130 on the front edge of the table platform 80.

Thus, it will be seen that as the bar 128 is rocked up and down about the pivot axis of the pillow block 129, the arm 125 engaged with the upper surface of the bar 128 will also be tilted up and down, the roller 131 rolling sideways across the top surface of the bar 128 slightly during the arcuate movement of the outer end of the arm 125.

The amount of angular movement of the arm 125 will depend upon its position of contact along the bar 128. This in turn can be adjusted by sliding the arm 125 along the shaft 110 as is permitted by the keyway connection 126—127.

When the arm 125 is relatively close to the pivot axis of the pillow block 129, its angular movement in response to a given degree of rocking movement of the bar 128 is relatively slight. When, on the other hand, the arm 125 is slid rearwardly so as to contact the bar 128 at a point relatively remote from the pillow block 129, the tilting of the arm 125 is relatively large in response to the same given movement of the bar 128.

The rocking action of the bar 128 is accomplished by means of a single lobe cam 132 keyed to the cam shaft 28. The lobe of the cam 132 rides in a cam follower block 133 secured to the under surface of the bar 128. As can be seen in Figures 5 and 7 the cam following surface of the block 133 has an arcuate portion 134 which is generally concentric about the axis of the shaft 28 when the bar 128 is in its raised or uppermost position. Thus, during a substantial part of the rotation of the cam 132 during which the outer end of the cam lobe is in contact with the surface 134, there is no rocking motion of the bar 128 and therefore said bar remains in its uppermost position during a substantial portion of the cam cycle. The purpose of this arrangement is to hold the grinding wheel 22 in a fixed tilted position during that part of its reciprocal movement when it is in actual contact with the saw tooth.

Similarly, it will be seen from an examination of Figure 5 that the bar 128 remains in a fixed lowermost position during a substantial part of the rotation of the cam 132 due to the fact that the latter is formed with a substantial dwell of uniform radius at the minimum diameter portion thereof.

The latter arrangement is necessary since the wheel 22 makes two operative reciprocating strokes for each revolution of the cam shaft 28 and thus the wheel must interrupt its tilting motion twice during each revolution of the cam shaft 28.

The relationship of the table reciprocating cam 85 and the wheel tilting cam 132 is such that the tilting motion of the wheel 22 as effected by the arm 125 occurs only during that portion of the operative cycle in which the wheel 22 is retracted away from the saw being operated on.

*The saw carriage feed mechanism*

The mechanism for feeding the saw carriage 50 along the tracks 51—52 is best seen in Figures 1, 9, and 10. As previously described, an elongated guide template 58 is clamped with the saw in the carriage 50. The guide template 58 is provided on its forward edge with teeth 140 having the same spacing as the teeth in the saw to be operated on. The toothed edge of the template 58 is offset from the toothed edge of the saw so as not to interfere with the operation of the grinding wheel 22 on the saw teeth.

The periodic advancing or intermittent motion of the carriage 50 is effected by a reciprocating feed finger 141, the extended end of which engages guide template 58 on the toothed edge thereof and the rearward end of which is pivotally attached at 143 to a link 142 which in turn is pivotally carried on a fixed pivot bolt 144. The fixed pivot bolt 144 is anchored in an anchorage bracket 145 which in turn is secured to the side frame member 32 and extends above the same as can be seen in Figure 9. A tension spring 146 having one end anchored to the feed finger 141 and the other end anchored to the bracket 145 urges rotation of the finger 141 and link 142 in a direction to pull the extended end of the finger into light pressure contact with the teeth 140 so as to assure operative engagement therewith.

As previously described, it is desirable to place the various mechanisms in operation before advancing the grinding wheel into actual engagement with the saw. As was described, this is accomplished by means of the control lever 101 operating through the tension rod 99. When setting up the machine and adjusting the mechanisms as above stated, it is also desirable that the feed finger 141 be disengaged from the guide template 58. For this reason the tension rod 99 has secured thereto and projecting upwardly therefrom an arm 147, the upper end of which is connected by a tie-rod 148 to the feed finger 141. Thus, when the tension rod 99 is moved rearwardly by operation of the control lever 101, the arm 147 at the same time pulls rearwardly on the finger 141 to disengage the same from the guide template 58.

Rotation of the cam 150 is clock-wise as seen in Figure 9 and the cam engages a cam follower block 155 having a cusp-shaped cam engaging surface at 156. The block 155 is secured to the under surface of the rocking beam 151.

As the cam 150 rotates in engagement with the cam follower block 155, the rocking beam 151 rises and falls pivoting about the axis of a mounting pillow block 157 which is carried on the previously mentioned flange 130.

The rocking motion of the beam 151 is transmitted to the crank lever 153 by means of the connecting rod 152. The upper end of the connecting rod 152 is connected to the beam 151 through a screw threaded attachment block 158 which in turn is mounted on a lead screw 159 journaled along the upper side of the beam 151. By rotating the lead screw 159 by an operating knob 160, the position of connection between the connection rod 152 and the beam 151 may be adjusted so as to change the ratio of corresponding movement as between the rocking beam 151 and the crank 153. The lower end of the connecting rod 152 is provided with a laterally projecting pivot member 161 which may be engaged with any one of a number of notches 162 along the lower edge of the crank lever 153. Thus the ratio of relative movement as between the beam 151 and the crank lever 153 may be adjusted further by changing the position at which the pivot member 161 engages the lower edge of the lever 153.

Since the rocking beam 151 and the cam 150 move reciprocably in a horizontal plane being mounted on the table platform 80, whereas the crank lever 153 is mounted by fixed pivot 163 to the side frame member 32, there is a considerable pivotal movement of the connecting rod 152 in addition to that which is caused by the rise and fall of the rocking beam 151.

The rocking motion of the crank lever 153 is transmitted to the motion transfer crank 154 by an upstanding edge 164 on the crank lever 153 which engages a horizontally projecting edge 164a on the motion transfer crank 154. As a result of this inter-engagement the motion transfer crank 154 swings in a horizontal plane as shown by the double headed arrow in Figure 10.

This swinging motion of the transfer crank 154 is in turn transmitted to the finger 141 by an adjustment thrust screw 165 which engages the link 142 at 166 which point, it will be seen is immediately behind the pivot point 143 connecting the finger 141 and the link 142. Thus, the finger 141 is reciprocated substantially longitudinally of itself as indicated by the double-headed arrow adjacent the pivot connection 143 in Figure 10. The purpose of the adjustment screw 165 is to advance or retard the starting position of the reciprocating strokes of the feed finger 141, and, it will be realized, does not substantially affect the length of such reciprocal strokes.

As in the case of the grinding wheel tilting mechanism, it is necessary that the feed finger 141 "dwell," i. e., remain substantially motionless during at least a portion of each tooth grinding operation. This is accomplished by the fact that the right-hand side of the cusp 156, as indicated at 168, is an arcuate surface substantially concentric with the cam shaft 28 when the rocking beam is in its uppermost position, as shown in Figure 9. Thus, during a portion of the cycle during which one of the lobes of the cam 150 is moving along the arcuate surface 168, there is no effective movement of the beam 151 and hence no movement of the feed finger 141. This is the portion of the cycle during which the front or cutting edge of each saw tooth is being ground by the grinding wheel 22.

During the time that one of the lobes of the cam 150 engages the left-hand side of the cusp 156, as seen in Figure 9, the rocking beam 151 is being lifted and it will be seen that the feed finger is being advanced thus moving the carriage through a distance equal to the spacing of one tooth. During this advancing movement of the saw carriage, the motion of the power table 23 is so synchronized that the grinding wheel 22 is just being withdrawn and the relative movement of the saw and the wheel is such as to grind a sloping surface on the back edge of the tooth, as will be described in more detail later herein.

The back stroke of the feed finger is adjusted to be slightly more than the tooth-to-tooth distance on the guide template, but substantially less than twice such spacing. Thus the feed finger 141 always is withdrawn far enough to snap back into the next tooth but never withdrawn far enough to pass over two successive teeth. Accurate adjustment of this motion is, of course, possible, since the position of the connecting rod 152 is infinitely adjustable along the lead screw 159.

Operation

In setting up the device herein described to regrind the teeth in a saw, such for example as the hand saw 175 shown in phantom line in Figure 10, the saw 175 and the guide template 58, having equivalent tooth spacing, are both clamped between the clamp jaws 56—57 at the edge of the saw carriage 50. The appearance of the saw teeth to be ground is illustrated in Figures 15 and 16, the same being somewhat exaggerated in size for the purposes of illustration.

By loosening the bolt 68 and swinging the entire carriage track assembly 20 thereabout, the position of the saw may be so adjusted that the front edges of the teeth indicated at 176 in Figure 15 are parallel to the direction of reciprocating movement of the wheel 22. It will be realized, of course, that the front edge of the tooth in hand saws is not always prependicular to the line of teeth, as is shown in Figure 15, but may slope rearwardly somewhat or in some cases even have a forward rake.

Vertical adjustment of the saw carriage track assembly 20 may now be made by means of the hand wheel 49 by which the saw may be raised or lowered into its appropriate relationship to the wheel 22. This adjustment is not always necessary, but may be made for example where saws of differing blade thickness are to be operated upon. With the angular and vertical positions of the carriage track assembly adjusted as aforesaid, the bolt 68 is then tightened.

With the control lever 101 pushed to its rearward position, thus withdrawing the grinding wheel 22 from operative position, the length of stroke of the feed finger 141 is adjusted by means of the adjustable lead screw 159 and the selective positioning of the pivot member 161, so that the stroke of the feed finger 141 is slightly greater than one tooth of the guide template 58 but less than two teeth thereof.

When the length of stroke has been properly adjusted, the start position is then adjusted by means of the thrust screw 165 until the grinding wheel 22 removes just the desired amount of material from the front edge of the saw tooth at 176 when the carriage motion is in its "dwell" or stationary portion of its intermittent movement.

The degree of tilt of the grinding wheel 22 is next adjusted by moving the arm 125 along the shaft 127. The tilted positions of the saw are illustrated at 177 in Figure 16, the angle being considerably exaggerated for purposes of illustration. It will be noted that the degree of tilt is the same in each direction from center or vertical positions.

The attitude of the grinding wheel 22 having been appropriately adjusted, the length of the table stroke is next adjusted by means of the hand crank 92. It will be realized, of course, that the length of the stroke is considerably greater than that necessary merely to form the teeth in the saw. A large part of the stroke adjacent the rearward limit of movement is taken up in reversing the tilt of the wheel and in advancing the saw carriage 50 to the position for grinding the next tooth.

The length of the stroke having been established, the forward limit thereof is now adjusted by means of the front hand wheel 108. It has been found convenient in making this adjustment to initially place the table and saw so that with the lever 101 swung to its forward or operating position, the wheel almost, but not quite, touches the saw. The remainder of the adjustment necessary to provide the desired tooth depth is then made by means of the hand wheel 108.

The foregoing adjustments having been made, the feed finger may then be lifted from the template 58 by operation of the lever 101, as previously described, and the saw carriage 50 moved to the start position. The device may thereupon set in operation and will automatically continue the successive grinding of the teeth until the entire toothed edge has been ground.

In some instances it may be necessary or desirable to stop the operation part way along the saw edge and redress the chisel-shaped peripheral edge of the wheel 22. This is done in the conventional manner with a diamond or similar wheel dressing tool. If a substantial amount of the wheel 22 is removed in the dressing operation, it may be necessary to make a slight adjustment with the hand wheel 108 to advance the strokes of the wheel with respect to the saw whereby to maintain uniform tooth depth.

During the grinding of the teeth, it will be noted that not only is the forward edge ground at 176 but during the advancing movement of the carriage the rear edge of the tooth at 178 is also ground by the beveled edge of the wheel 22 which is retreating from the saw at the same time the latter is being moved forwardly to its next position. Alternatively, for very fine teeth, the actual tooth shape may be formed in the edge of the wheel by appropriate dressing thereof.

Thus it will be seen that a substantially universal device has been provided on which saws of many different tooth shapes and tooth spacings may be reground. Circular saws may even be reground on this device by removing the carriage track assembly 20 and mounting the saw on a vertical spindle projecting upwardly from the cross member 69. On such occasions a circular template may be used having teeth spaced the same as on the circular saw being reground, and the feed finger 141 will rotatively advance the circular saw in the same manner as the linear movement of the carriage 50.

While the form of the device shown is fully capable of achieving the objects and providing the advantages hereinbefore stated, it will be realized that considerable modification is possible without departure from the spirit of the invention. For this reason we do not mean to be limited to the forms shown and described, but rather to the scope of the appended claims.

We claim:

1. A saw sharpener comprising: clamping means to support a saw in a given plane; a rotary abrasive wheel having a relatively narrow peripheral edge adapted to sharpen saw teeth one at a time; mounting means for said wheel adapted to support the same for rotation adjacent the toothed edge of a saw supported in said clamping means, said mounting means including a shaft journaled on an axis coinciding substantially with an extended radius of said wheel whereby to permit tilting movement of said wheel about the axis of said shaft;

power means to rotate said wheel; reciprocating means to move said wheel toward and away from said saw to intermittently engage and sharpen the teeth thereof; tilting means for said wheel including an arm rotatively coupled to said shaft and projecting radially therefrom and a bar mounted on a fulcrum to rock in a plane substantially parallel to said shaft, the distal end of said arm being engaged with a surface of said bar at a point spaced from said fulcrum whereby rocking of said bar causes rotation of said shaft and tilting of said wheel; means synchronously interconnected with said reciprocating means to rock said bar reciprocally whereby to tilt said wheel between alternate oppositely inclined positions with respect to said plane on successive reciprocations of said wheel; and means to move said clamping means to carry the teeth of said saw successively into positions to be engaged by said wheel.

2. A saw sharpener comprising: clamping means to support a saw in a given plane; a rotary abrasive wheel having a relatively narrow peripheral edge adapted to sharpen saw teeth one at a time; mounting means for said wheel adapted to support the same for rotation adjacent the toothed edge of a saw supported in said clamping means, said mounting means including a shaft journaled on an axis coinciding substantially with an extended radius of said wheel whereby to permit tilting movement of said wheel about the axis of said shaft; power means to rotate said wheel; reciprocating means to move said wheel toward and away from said saw to intermittently engage and sharpen the teeth thereof; tilting means for said wheel including an arm rotatively coupled to said shaft and projecting radially therefrom and a bar mounted on a fulcrum to rock in a plane substantially parallel to said shaft, the distal end of said arm being engaged with a surface of said bar at a point spaced from said fulcrum whereby rocking of said bar causes rotation of said shaft and tilting of said wheel; means synchronously interconnected with said reciprocating means to rock said bar reciprocally whereby to tilt said wheel between alternate oppositely inclined positions with respect to said plane on successive reciprocations of said wheel; an adjustable motion transmitting linkage in said tilting means for adjusting the spacing between said fulcrum and the point of engagement of said arm and bar whereby to vary the degree of inclination of said wheel in said inclined positions thereof to adapt said wheel for saws of differing tooth bevel; and means to move said clamping means to carry the teeth of said saw successivly into positions to be engaged by said wheel.

3. A saw sharpener comprising: movable clamping means to support a saw in a given plane; a rotary abrasive wheel having a peripheral edge adapted to sharpen saw teeth; mounting means for said wheel adapted to support the same for rotation adjacent the toothed edge of a saw supported in said clamping means; power means to rotate said wheel; motion synchronizing means including a rotatable cam shaft adjacent said mounting means and power means to rotate said cam shaft in a uniform rate; means drivingly connected to said cam shaft to reciprocate said wheel toward and away from said saw to intermittently engage the same and sharpen the teeth thereof; feed means for said clamping means including a cam on said cam shaft and a cam follower drivingly connected to said clamping means and adapted to intermittently move said clamping means between reciprocations of said wheel to carry the teeth of said saw successively into positions to be engaged by said wheel, said cam having a dwell therein whereby said clamping means remains motionless during a portion of said reciprocation during which said wheel is engaged with said saw and moving toward said saw, said cam having a rise portion following said dwell whereby to start said intermittent feed movement while said wheel is engaged with said saw and moving away from the same whereby to grind a sloping surface on the back edges of the teeth of said saw.

4. A saw sharpener comprising: a base frame; a transverse horizontal track on said frame; a saw carriage mounted on said track for movement therealong and having means to carry a saw in a horizontal plane on said carriage; longitudinal horizontal ways in said frame; a table mounted on said ways for movement therealong; a mount shaft journaled on said table on a longitudinal axis therein, and substantially in the plan of said saw, said shaft having a transverse arbor affixed to the end thereof adjacent said saw carriage; an abrasive wheel rotatably mounted on said arbor; a prime mover on said table drivingly connected to said wheel to rotate the same; a cam shaft journaled on said table and connected to said prime mover to be rotated at a uniform rate; a tilting cam on said cam shaft; a cam follower engaged with said tilting cam and drivingly connected to said mount shaft to tilt the same back and forth between alternate inclined positions as said cam shaft rotates; reciprocating means drivingly connected to said cam shaft to reciprocate said table along said ways to intermittently engage said wheel with a saw on said carriage, said reciprocating means being synchronized with said tilting cam whereby said engagements are made with said wheel in one or the other of said alternate positions; and feed means drivingly connected between said cam shaft and carriage to move said carriage intermittently between said engagements.

5. The construction of claim 4 further characterized in that said reciprocating means includes a variable ratio motion transmitting lever adapted to adjust the length of reciprocations of said table whereby to adapt said sharpener for saws having differing tooth depth.

6. The construction of claim 4 further characterized in that said feed means includes a feed cam on said cam shaft, a cam follower engaged with said feed cam, and motion transmitting linkage connected between said last cam follower and carriage to intermittently advance said carriage as said cam shaft rotates.

References Cited in the file of this patent

UNITED STATES PATENTS

| | | |
|---|---|---|
| 381,775 | Halladay | Apr. 24, 1888 |
| 574,855 | Schofield | Jan. 5, 1897 |
| 867,723 | Hedstrom | Oct. 8, 1907 |
| 1,179,752 | Pangburn | Apr. 18, 1916 |
| 1,272,339 | Hunter | July 9, 1918 |
| 1,480,172 | Majewicz | Jan. 8, 1924 |
| 1,491,706 | Klin | Apr. 22, 1924 |
| 1,846,331 | Hickey | Feb. 23, 1932 |
| 2,329,879 | Christy et al. | Sept. 21, 1943 |
| 2,333,298 | Daggett | Nov. 2, 1943 |
| 2,379,642 | Kiechle | July 3, 1945 |
| 2,675,717 | Standal | Apr. 20, 1954 |
| 2,691,311 | Robinson et al. | Oct. 12, 1954 |
| 2,722,852 | Anderson | Nov. 8, 1955 |

FOREIGN PATENTS

| | | |
|---|---|---|
| 13,008 | Great Britain | A. D. 1915 |